United States Patent
Duffield et al.

(10) Patent No.: US 8,935,188 B2
(45) Date of Patent: Jan. 13, 2015

(54) METHOD AND APPARATUS FOR CLASSIFYING APPLICATIONS USING THE COLLECTIVE PROPERTIES OF NETWORK TRAFFIC IN A TRAFFIC ACTIVITY GRAPH

(75) Inventors: Nicholas Duffield, Summit, NJ (US); Patrick Haffner, Highlands, NJ (US); Yu Jin, St. Paul, MN (US); Subhabrata Sen, New Providence, NJ (US); Zhi-Li Zhang, Minneapolis, MN (US)

(73) Assignees: AT&T Intellectual Property I, L.P., Atlanta, GA (US); Regents of the University of Minnesota, Minneapolis, MN (US)

( * ) Notice: Subject to any disclaimer, the term of this patent is extended or adjusted under 35 U.S.C. 154(b) by 598 days.

(21) Appl. No.: 12/858,303

(22) Filed: Aug. 17, 2010

(65) Prior Publication Data

US 2012/0047096 A1 Feb. 23, 2012

(51) Int. Cl.
*G06F 15/18* (2006.01)
*G06F 15/173* (2006.01)
*H04L 12/26* (2006.01)
*H04L 29/08* (2006.01)

(52) U.S. Cl.
CPC .............. *H04L 43/045* (2013.01); *H04L 67/22* (2013.01); *H04L 43/026* (2013.01)
USPC ........................................... 706/12; 709/224

(58) Field of Classification Search
USPC ......................................................... 706/12
See application file for complete search history.

(56) References Cited

U.S. PATENT DOCUMENTS 6,466,687 B1 * 10/2002 Uppaluri et al. .............. 382/128
7,624,448 B2 * 11/2009 Coffman ......................... 726/23

OTHER PUBLICATIONS

Karagiannis, Thomas Konstantina Papagiannaki and Michalis Faloutsos. "BLINC: Multilevel Traffic Classification in the Dark" SIGCOMM 2005 ACM [Online] Downloaded Sep. 16, 2012 http://conferences.sigcomm.org/sigcomm/2005/paper-KarPap.pdf.*
Iliofotou, Marios Prashanth Pappu and Michalis Faloutsos "Network Monitoring using Traffic Dispersion Graphs (TDGs)" iMC Oct. 7, 2007 [Online] Downloaded Sep. 16, 2012 http://www.itk.ilstu.edu/faculty/ytang/traffic/Network%20Monitoring%20using%20Traffic%20Dispersion%20Graphs.pdf.*
BErnaille, Laurent et al "Traffic Classification on the Fly" ACM SIGCOMM Computer Communication Review vol. 36, No. 2, Apr. 2006 [Online] Downloaded Apr. 30, 2014 http://dl.acm.org/citation.cfm?id=1129589.*
Nguyen, Thuy T.T. and Grenville Armitage "A Survey of Techniques for Internet Traffic Classifiaction using Machine Learning" IEEE 2008 [Online] Downloaded Sep. 2, 2014 Well if you end up being in Rome for some reason, send me an email (Rifkinb@gmail.com). I'll be there.*

* cited by examiner

*Primary Examiner* — Ben Rifkin (57) ABSTRACT

In one embodiment, the present disclosure is a method and apparatus for classifying applications using the collective properties of network traffic. In one embodiment, a method for classifying traffic in a communication network includes receiving a traffic activity graph, the traffic activity graph comprising a plurality of nodes interconnected by a plurality of edges, where each of the nodes represents an endpoint associated with the communication network and each of the edges represents traffic between a corresponding pair of the nodes, generating an initial set of inferences as to an application class associated with each of the edges, based on at least one measured statistic related to at least one traffic flow in the communication network, and refining the initial set of inferences based on a spatial distribution of the traffic flows, to produce a final traffic activity graph.

20 Claims, 6 Drawing Sheets

METHOD AND APPARATUS FOR CLASSIFYING APPLICATIONS USING THE COLLECTIVE PROPERTIES OF NETWORK TRAFFIC IN A TRAFFIC ACTIVITY GRAPH

FIELD OF THE DISCLOSURE

The present disclosure relates generally to network communications and relates more particularly to the classification of network applications.

Operating, managing, and securing a network require a thorough understanding of the demands placed on the network by the endpoints that the network connects, the characteristics of the traffic generated by the endpoints, and the distribution of the traffic over the resources of the network infrastructure. A major differentiator in the types of resources required by traffic is the class of endpoint application that generates the traffic. For example, delay-sensitive low-rate real-time communications (e.g., Voice over Internet Protocol (VoIP) sessions) do not have the same resource requirements as high-rate but relatively delay-insensitive file transfers (e.g., multimedia downloads). Service providers need to understand the mix of traffic so that they may make the appropriate resource allocations to each application class and also so that they can deny resources to traffic that presents security threats (e.g., malware propagation, network attacks, etc.).

Service providers typically determine the application mix present in traffic via traffic flow measurements provided by routers. These measurements comprise summaries of packet flows with common header properties, such as source and destination Internet Protocol (IP) addresses, transmission control protocol/user datagram protocol (TCP/UDP) ports, total numbers of packets and bytes, and timing information. Although application classes can be determined fairly accurately from this data, protocol-level information (e.g., TCP/UDP ports and other parts of the transport header, but also parts of the network header in some cases) may not always be accessible or reported due to the use of encryption or tunneling protocols by endpoints or gateways. Furthermore, the utility of ports as signifiers of application class is limited by abuse and non-standard usage. Such factors limit the accuracy of application classification based on transport and network header characteristics.

SUMMARY

In one embodiment, the present disclosure is a method and apparatus for classifying applications using the collective properties of network traffic. In one embodiment, a method for classifying traffic in a communication network includes receiving a traffic activity graph, the traffic activity graph comprising a plurality of nodes interconnected by a plurality of edges, where each of the nodes represents an endpoint associated with the communication network and each of the edges represents traffic between a corresponding pair of the nodes, generating an initial set of inferences as to an application class associated with each of the edges, based on at least one measured statistic related to at least one traffic flow in the communication network, and refining the initial set of inferences based on a spatial distribution of the traffic flows, to produce a final traffic activity graph.

BRIEF DESCRIPTION OF THE DRAWINGS

The teaching of the present disclosure can be readily understood by considering the following detailed description in conjunction with the accompanying drawings, in which:

FIG. 3 is a line graph illustrating the distribution of edge types among all network endpoint pairs as defined using the dominant application class associated with the most number of flows between;

To facilitate understanding, identical reference numerals have been used, where possible, to designate identical elements that are common to the figures.

DETAILED DESCRIPTION

In one embodiment, the present disclosure is a method and apparatus for classifying applications using the collective properties of network traffic. These applications may include, for example, web access, VoIP, teleconferencing, email, online gaming, multimedia downloads or streaming, peer-to-peer file sharing, and the like. Embodiments of the disclosure infer the distribution of application classes present in the aggregated traffic flows between network endpoints by exploiting both the measured statistics of the traffic flows and the spatial distribution of the traffic flows across the network. One particular embodiment of the disclosure employs a two-step supervised model. In the first step, initial inferences on the traffic application classes are provided. In the second step, the initial inferences are adjusted through the collective spatial traffic distribution.

Embodiments of the disclosure employ a data structure that is referred to herein as a "traffic activity graph" or "TAG." A TAG is a bi-partite graph comprising a plurality of nodes interconnected by edges, where the nodes represent network endpoints. A pair of nodes is joined by an (undirected) edge if there is any traffic between the nodes. Within the context of a set of flow measurement data, the existence of a flow between two network endpoints implies the existence of an edge between the corresponding nodes. In one embodiment of the disclosure, each edge is associated with a color (or other visual differentiator) that encodes the application class of the traffic. In one embodiment, there is a one-to-one mapping between application classes and colors. In other words, no two application classes are represented by the same color (and no two colors will represent the same application class).

Embodiments of the disclosure also make certain assumptions about the properties of TAGs, based on a reference set of flow measurements for which application classes are already known. First, it is assumed that traffic between any pair of network endpoints is overwhelmingly likely to derive from a single application; hence, each edge will be associated with a single color. Second, edges at a given node are frequently associated with a single color, giving rise to interconnected clusters of the same color (i.e., in which all network endpoints tend to use the same application). On the other hand, the boundaries that separate regions of different color tend to be irregular, and graph properties alone do not appear to easily determine the color of the regions. For this reason, embodiments of the disclosure augment the TAG with traffic statistics. Specifically, each edge is associated with a set of traffic features derived from the flow records associated with the corresponding pair of nodes (e.g., average flow duration, number of bytes, number of packets, etc.).

Figure 1:
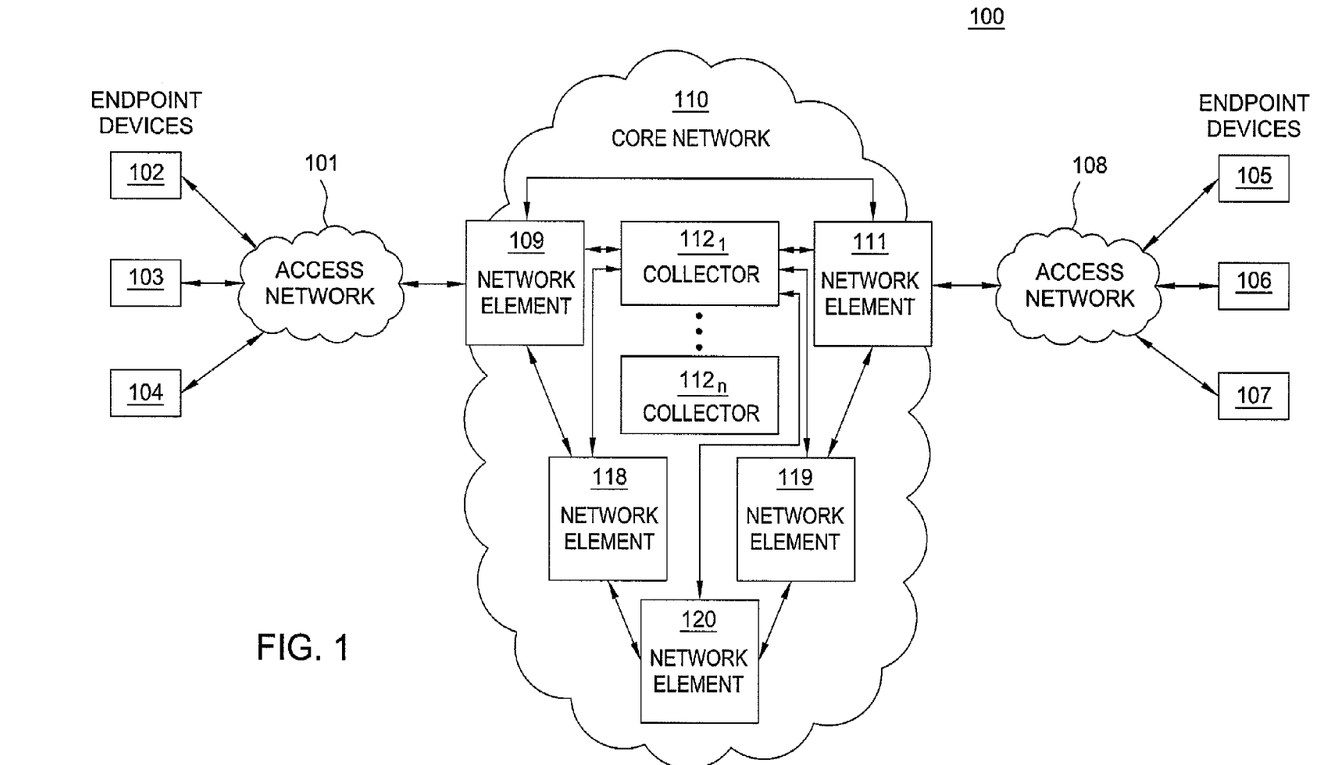
FIG. 1 is a block diagram illustrating an exemplary packet network, configured according to embodiments of the current disclosure.

FIG. 1 is a block diagram illustrating an exemplary packet network 100, configured according to embodiments of the current disclosure. Exemplary packet networks include Internet Protocol (IP) networks, Ethernet networks, and the like. An IP network is broadly defined as a network that uses Internet Protocol such as IPv4 or IPv6 to exchange data packets.

In one embodiment, a first plurality of endpoint devices 102-104 reside outside the packet network and are configured for communication with the core packet network 110 (e.g., an IP-based core backbone network) via a first access network 101. Similarly, a second plurality of endpoint devices 105-107 reside outside the packet network and are configured for communication with the core packet network 110 via a second access network 108.

The network elements (NEs) 109, 111, 118, 119, and 120 may serve as gateway servers or edge routers for the core packet network 110. In one embodiment, the first and second plurality of endpoint devices 102-104 and 105-107 comprise ISDN private branch exchanges (PBXs), automatic call distributors (ACDs), or ISDN telephones. In one embodiment, the first and second access networks 101 and 108 are time division multiplex (TDM) networks.

The endpoint devices 102-107 may also comprise customer endpoint devices such as personal computers, laptop computers, Personal Digital Assistants (PDAs), landline telephones, cellular telephones, servers, routers, and the like. In one embodiment, at least some of the endpoint devices 102-107 are ISDN telephones. The first and second access networks 101 and 108 serve as a means to establish a connection between the endpoint devices 102-107 and the NEs 109 and 111 of the core packet network 110. Thus, the endpoint devices 102-107 are outside of the access networks 101 and 108 and the core packet network 110. The first and second access networks 101 and 108 may each comprise a Digital Subscriber Line (DSL) network, a broadband cable access network, a Local Area Network (LAN), a Wireless Access Network (WAN), a third party network, and the like. The first and second access networks 101 and 108 may be either directly connected to NEs 109 and 111 of the core packet network 110, or indirectly through another network.

Some NEs (e.g., NEs 109 and 111) reside at the edge of the packet network 110 and interface with customer endpoint devices 102-107 over various types of access networks (e.g., first and second access networks 101 and 108). An NE that resides at the edge of a core infrastructure is typically implemented as an edge router, a media gateway, a border element, a firewall, a switch, or the like. An NE may also reside within the network (e.g., NEs 118-120) and may be used as a mail server, a router, or a like device.

The core packet network 110 also comprises one or more collectors $112_1$-$112_n$ (hereinafter referred to collectively as "collectors 112"). The collectors 112 are special-purpose traffic measurement devices that collect flow records representing traffic exchanged between the endpoint devices 102-107 over the packet network 100. The collectors 112 annotate these flow records with labels that indicate the applications of which the flow records are a part. In one embodiment, the labels are generated in an automated manner using a set of packet-level rules based on combinations of packet signatures that operate on layer-4 packet header information and layer-7 application protocol signatures. These labels are, in turn, used to define the colors of the edges in a TAG, as discussed in greater detail below. In the embodiment in which multiple collectors 112 are employed, the collectors 112 operate at geographically dispersed sites in the packet network 100.

Those skilled in the art will realize that although only six endpoint devices 102-107, two access networks 101 and 108, and so on are depicted in FIG. 1, the packet network 100 may be expanded by including additional endpoint devices, access networks, border elements, and the like without altering the present disclosure.

In one embodiment, the present disclosure first trains the collectors 112 to infer the colors of edges in a TAG. The datasets used for training comprises network flow records from an Internet service provider (ISP) over a period of time. Within the context of the present disclosure, a "flow" is a sequence of packets with a common key (e.g., the standard five-tuple of IP protocol, source and destination IP addresses, and TCP/UDP ports) that are localized in time. Flow measurements comprise summary statistics that aggregate information derived from a flow's packet headers (e.g., the key, aggregate packet and byte counts for the flow, timing information, etc.) that are exported as IP flow records to the collectors 112. The IP flow records do not typically include any application data or report any user identity information.

In one embodiment, sampling is employed in the creation of flow records to compensate for high traffic volume. For example, one out of every twenty flows may be reported, sampling over the standard flow level five-tuples. However, for each sampled flow, the flow record aggregates header information from all packets, without further sampling.

Serving as the ground truth for both training and operation purposes, the flow records in the datasets are annotated, as discussed above, with a number of broad "application class" labels, which are then used to define edge colors that represent the dominant application between two network endpoints. The dominant application between two network endpoints is the application that corresponds to the maximum number of flows among all traffic on the edge that joins the two network endpoints. In one embodiment, the present disclosure defines twelve broad application class labels, shown below in Table 1; however, different numbers of application class labels can be employed without departing from the scope of the present disclosure.

TABLE 1

| TCP/UDP broad application classes | | | |
|---|---|---|---|
| INDEX | TCP/UDP | CLASS/LABEL | EXAMPLE APPLICATIONS |
| 1 | TCP/UDP | Business | Middleware, VPN |
| 2 | TCP/UDP | NetNews | News |
| 3 | TCP | Web | HTTP applications |
| 4 | TCP/UDP | Multimedia | RTSP, MS-Streaming |
| 5 | TCP/UDP | VoIP | SIP applications |
| 6 | TCP/UDP | Chat | Messengers, IRC |
| 7 | TCP/UDP | FileSharing | P2P applications |
| 8 | TCP | FTP | FTP applications |
| 9 | TCP/UDP | Games | Everquest, WoW, Xbox |
| 10 | TCP | Mail | SMTP, POP |

TABLE 1-continued

TCP/UDP broad application classes

| INDEX | TCP/UDP | CLASS/LABEL | EXAMPLE APPLICATIONS |
|---|---|---|---|
| 11 | TCP/UDP | DNS | DNS applications |
| 12 | TCP | SecurityThreat | Worms and Trojans |

It is noted that the twelve application classes defined in Table 1 are not defined uniquely by transport protocols and port numbers (i.e., there is no one-to-one correspondence between applications labels and port numbers). For instance, while hypertext transfer protocol (HTTP) and TCP port 80 are often used by the four classes, the more specific classes of NetNews, Multimedia (as well as some Business) applications are defined separately from general Web access. Furthermore, the Multimedia and Business classes may use port numbers other than TCP port 80.

The distribution of flows over the application classes listed in Table 1 is highly unbalanced. For example, the classes of Web and FileSharing typically account for approximately sixty to eighty percent of the total flows, while classes such as NetNews and SecurityThreat tend to contain only a few thousand flows out of millions. In addition, a portion of the flows (e.g., approximately twenty-nine percent of the total flows, representing approximately twenty percent of the total bytes) cannot be classified using a packet-based classifier or collector (i.e., the flows do not match any rule). Causes for this inability to classify flows may include the use of encryption by application-level data or the presence of new applications or security threats (for which signatures are not yet available).

Figure 2:
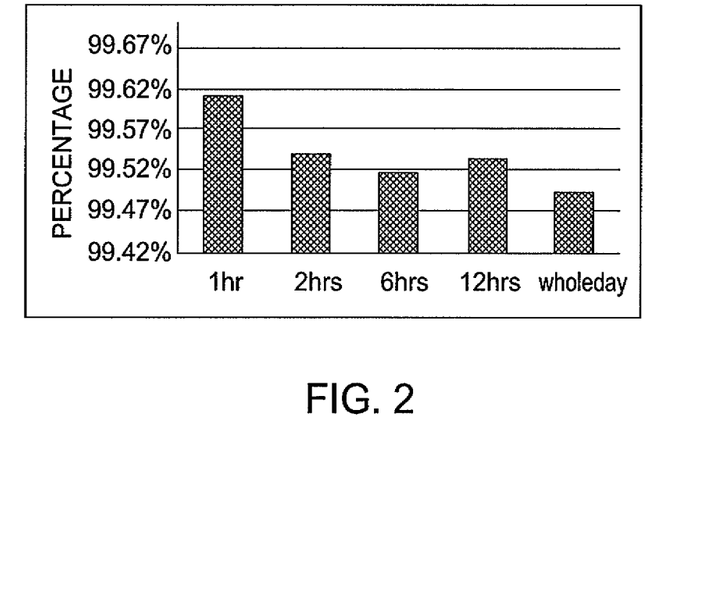
FIG. 2, for example, is a bar graph illustrating the percentage of edges whose flows fall within a single application class versus various-sized windows of time.
Figure 3:
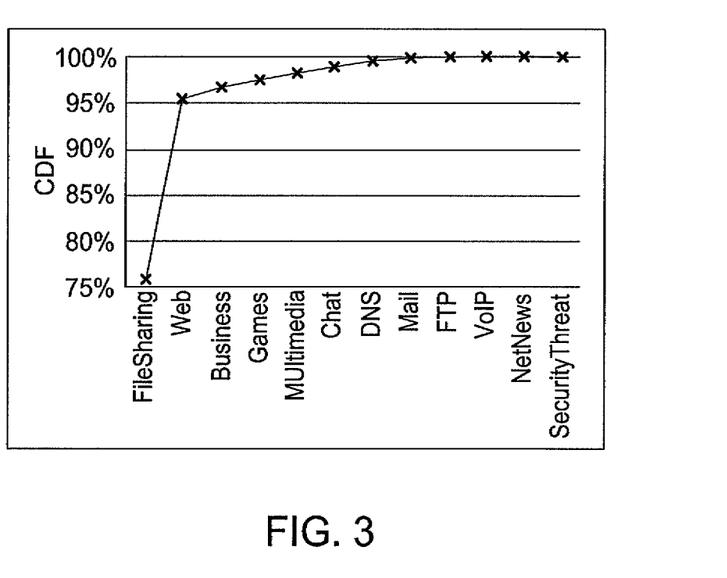

Using the application classes listed in Table 1, one can determine how many pairs of network endpoints generate only one type of application traffic (i.e., whether all flows between the pair of network endpoints fall within a single application class). FIG. 2, for example, is a bar graph illustrating the percentage of edges (y axis) whose flows fall within a single application class versus various-sized windows of time (x axis). In all cases, even when extending the time window to an entire day ("wholeday"), for a majority (e.g., approximately 99.5% or more) of the edges, all flows between the corresponding network endpoints fall within a single application class. Such an edge can be labeled with a single color (or other visual differentiator). Further analysis shows that even among the edges having flows belonging to multiple application classes, one class tends to dominate, and thus these edges can also be labeled with a single color corresponding to the dominant application class. FIG. 3, for example, is a line graph illustrating the distribution of edge types among all network endpoint pairs as defined using the dominant application class associated with the most number of flows between.

As discussed above, the present disclosure also augments each edge in the TAG with an attribute set. The attribute set comprises a set of flow-level traffic statistics derived from the flows between the two network endpoints associated with an edge. In one embodiment, the present disclosure defines eleven flow-level features, shown below in Table 2; however, different numbers of flow-level features can be employed without departing from the scope of the present disclosure.

TABLE 2

| Flow-level features | | | |
|---|---|---|---|
| NAME | TYPE | NAME | TYPE |
| duration | numeric (*) | packet | numeric |
| mean_packet_size | numeric (*) | byte | numeric |
| mean_packet_rate | numeric (*) | tos | numeric |
| toscount | numeric | numtosbytes | numeric |
| tcpflags | categorical | srcinnet | {0, 1} |
| dstinnet | {0, 1} | | |

Features marked with a (*) in Table 2 are not reported directly in the flow records, but rather are computed from quantities thereof. Duration, packet, and byte represent the length of the flow, number of packets in the flow, and number of bytes in the flow, respectively. Mean_packet_size represents the average bytes per packet, and mean_packet_rate is the average packet interarrival time in seconds. TCPflag represents all possible TCP flags in the packets. The TOS (type of service) related features, tos, toscount, and numtosbytes represent the predominant TOS byte, the number of packets that were marked with tos, and the number of different tos bytes seen in the flow, respectively. The last two features, scrinnet and dstinnet, equal one if the source/destination address belongs to the packet network and equal zero otherwise.

Given the datasets, the concept of colored TAGs can be introduced, which embody both the spatial disposition of traffic and the applications used. As discussed above, a TAG is defined using the flows (with known class labels) from a specific time window T (e.g., one hour, one day, etc.) and describes endpoint pairs represented in the flows. Formally, let H=IH ∪ OH denote the set of observed endpoints, where IH is the set of all endpoints internal to the ISP network and OH is the set of endpoints external to the ISP network that exchange traffic with internal endpoints.

In one embodiment, an uncolored TAG G=(H, E) is first constructed as follows. First, an edge $e_{i,j}$ is included in the set of edges E if and only if at least one flow is observed between an internal/external endpoint pair $h_i \epsilon IH$ and $h_j \epsilon OH$ (for topological reasons, the dataset does not include reports of any flows exchanged between pairs of internal endpoints). The colored TAG is then defined by coloring each edge of the TAG according to the dominant application class label associated with the flows on the edge. Formally, for each edge $e_{i,j} \epsilon E$, the dominant application class label associated with the edge is defined as $L(e_{i,j})$. $L(e_{i,j})$ may also be referred to as the "color" of the edge $e_{i,j}$.

Figure 4:
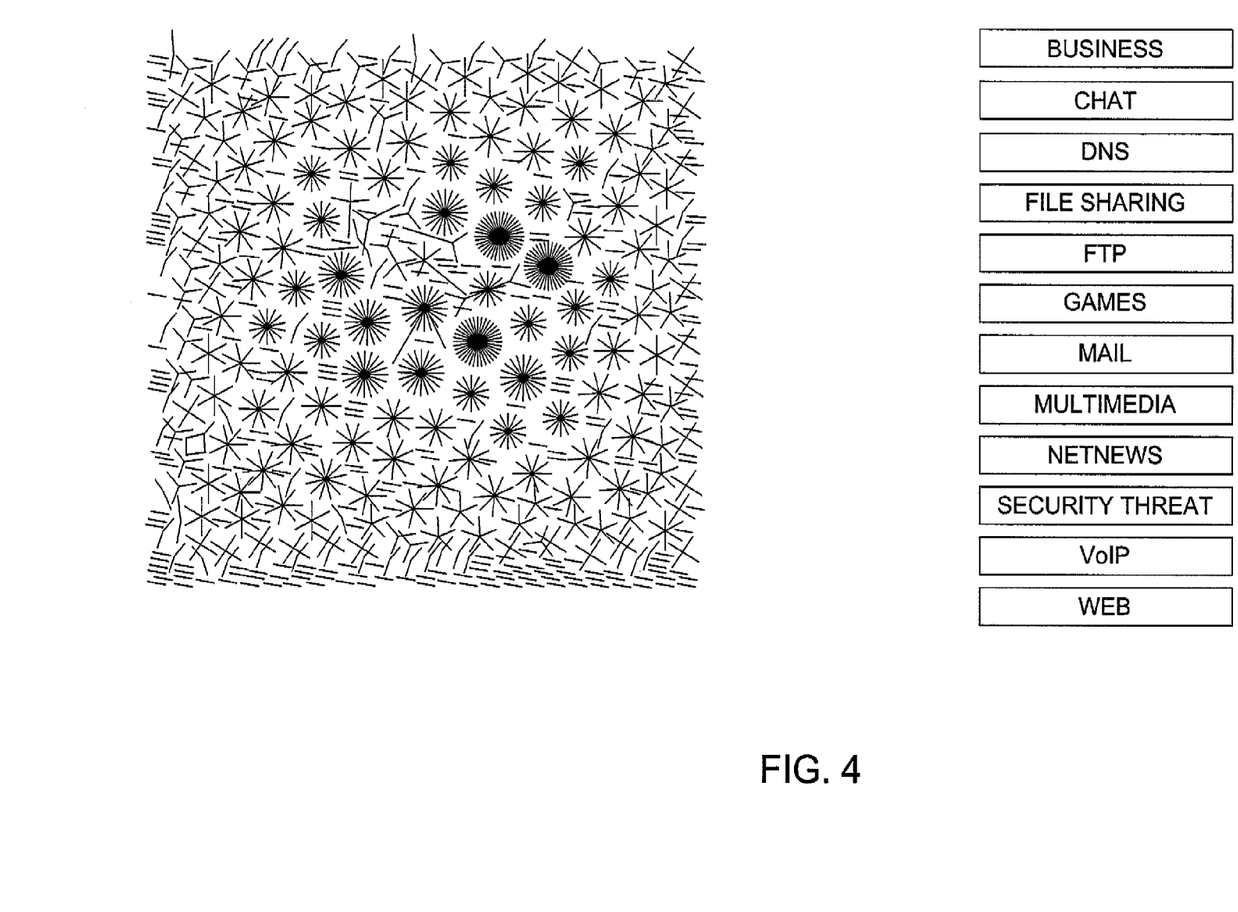
FIG. 4 illustrates an exemplary traffic activity graph for a collection of approximately two thousand edges.

FIG. 4, for example, illustrates an exemplary traffic activity graph for a collection of approximately two thousand edges. Edges associated with the more dominant application classes (e.g., FileSharing, Web) can be removed from the TAG in order to better visualize the spatial distribution of traffic associated with less-used application classes.

A few salient local properties of colored TAGs motivate the TAG color inference problem to which at least a portion of this disclosure is directed. For example, edge colors tend to be clustered together (i.e., edges incident on a common node often share the same color); hence, regions of the TAG seem to have the same color. This suggests that certain groups of endpoints tend to generate traffic in a similar manner (e.g., by exchanging traffic with the same set of web servers). On the other hand, local graph structures tend not to necessarily be indicative of the color of edge clusters. For instance, many edge clusters have a similar "star-like" structure, but with different colors emanating therefrom (i.e., many edges of different colors may be incident on the same node). Thus, a plurality of qualitative and quantitative characteristics of colored TAGs may bear on the TAG color inference problem.

Figure 5:
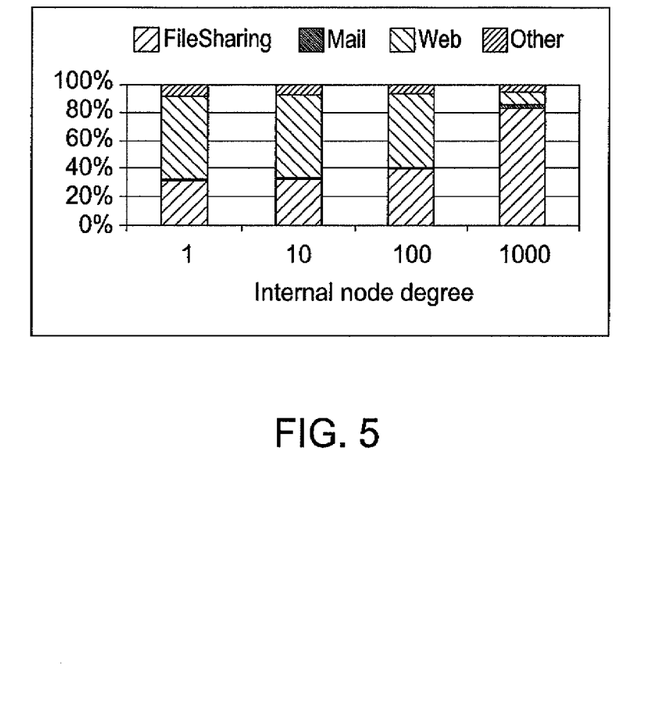
FIG. 5 is a bar graph illustrating the proportions of dominant applications connected to the internal endpoints of an exemplary network with a degree greater than one, ten, one hundred, and one thousand.

A first of these characteristics is degree distribution. FIG. 5 is a bar graph illustrating the proportions of dominant applications connected to the internal endpoints of an exemplary ISP network with a degree greater than one, ten, one hundred, and one thousand. As illustrated, the FileSharing application becomes more dominant as the degree of the internal endpoints increases. This is not surprising, since endpoints with high degrees are more likely to generate P2P traffic. The decrease of the proportion of the Web edges is also an artifact of the increasing number of FileSharing edges.

Figure 6:
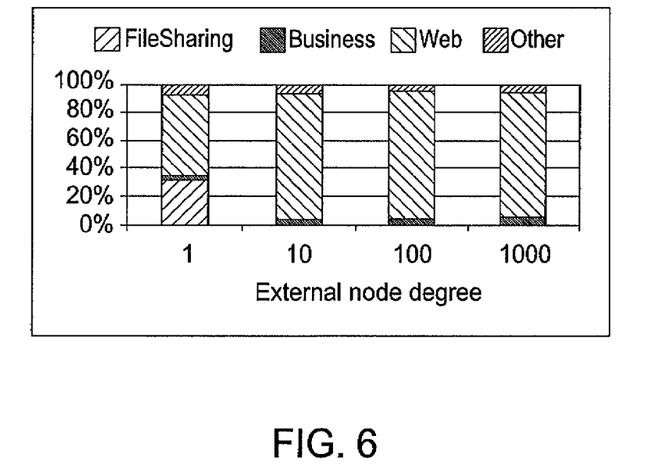
FIG. 6 is a bar graph illustrating the proportions of dominant applications connected to the external endpoints of the exemplary network with a degree greater than one, ten, one hundred, and one thousand.

FIG. 6 is a bar graph illustrating the proportions of dominant applications connected to the external endpoints of the exemplary ISP network with a degree greater than one, ten, one hundred, and one thousand. Since only a partial view of the traffic generated by the external endpoints is offered, the changes in the proportions appear to be significantly different from those illustrated in FIG. 5. For instance, as the degree of the external endpoints increases, the percentage of FileSharing edges rapidly decreases. This is due to the fact that internal endpoints with FileSharing traffic often connect to a large number of external endpoints, but the probability that two external endpoints are connected by the same internal endpoint is very small (thereby resulting in a large number of low degree external FileSharing endpoints). By contrast, the proportion of Web edges increases significantly with node degree, and the majority of the Web edges are contributed by popular external Web services.

A second significant colored TAG characteristic is the so-called "clustering effect." As discussed above, edges of the same color (application class) tend to cluster together, incident on one or a few endpoints and often forming a star-like structure. Hence, a colored TAG contains many local clusters of a single color. This clustering effect can be quantified for large TAGs using a probabilistic formulation: given an edge with label L, what is the probability that at least one of the two endpoints has all of its associated edges labeled as L? To eliminate the impact of degree-one nodes in the TAG, one can consider this probability only for nodes having a degree of at least two.

This probability can be compared with the probability that, given a randomly selected edge, one of the two endpoints (with a degree of at least two) has all of its associated edges labeled as L. Table 3, below, illustrates the comparison results for all edge types.

TABLE 3

Quantifying the clustering effect

| CLASS C | RANDOM (%) | ONE EDGE FROM C (%) |
| --- | --- | --- |
| Business | 1.98 | 65.13 |
| Chat | 0.57 | 49.98 |
| DNS | 0.04 | 88.50 |
| FileSharing | 10.16 | 93.51 |
| FTP | 0.19 | 62.83 |
| Games | 0.15 | 59.88 |
| Mail | 0.85 | 94.51 |
| Multimedia | 0.72 | 30.51 |
| NetNews | 0.00 | 6.95 |
| SecurityThreat | N/A | N/A |
| VoIP | 0.00 | 0.57 |
| Web | 52.65 | 65.02 |

As demonstrated by Table 3, the clustering effect is also present and prevalent in large colored TAGs. Further inspection shows that many (large) single-colored clusters are the result of the inherent client/server or peer-to-peer structure of the applications. For example, given a Web edge, it is known that one of the endpoints must be an HTTP server. Since most HTTP servers support Web traffic exclusively, other edges that connect to the HTTP server are also likely to be Web edges. The prevalence of this clustering effect allows one to exploit the neighborhood information inherent in the TAG to infer edge colors. For instance, given information about one particular edge connected to two endpoints, the accuracy of inferring the colors of the other edges associated with those endpoints can be improved.

A third significant colored TAG characteristic can collectively be referred to as repulsive and attractive effects. Within the context of the present disclosure, a "repulsive effect" refers to the instance in which, given two edge colors, the presence of one of those edge colors among the edges incident on an endpoint significantly reduces the chance of the other edge color appearing among the same edges (or, conversely, increases the chance of the other edge color being absent). On the other hand, an "attractive effect" refers to the instance in which, given two edge colors, the presence of one of those edge colors among the edges incident on an endpoint significantly increases the chance of the other edge color appearing among the same edges. Table 4, below, illustrates some examples of both repulsive and attractive effects, where each row of the table represents one type of the repulsive/attractive effects, and the letter "R" or "A" indicates whether the effect is repulsive or attractive, respectively. For example, the first row of Table 4 can be read as follows: With the knowledge of an edge labeled as Business, that chance that the corresponding external endpoint has no Web edges will increase from 16.14% (randomly selected edges) to 91.35 percent (an example of the repulsive effect).

TABLE 4

Examples of repulsive (R) and attractive (A) effects

| AMONG EXTERNAL ENDPOINTS | | |
| --- | --- | --- |
| $L(e_{i,j})$ = Business | R | $P(\text{Web} \notin L(e_{i,j}))$: 16.46% ⇒ 91.35% |
| $L(e_{i,j})$ = Chat | R | $P(\text{Multimedia} \notin L(e_{i,j}))$: 75.63% ⇒ 99.62% |
| $L(e_{i,j})$ = Mail | R | $P(\text{Multimedia} \notin L(e_{i,j}))$: 75.63% ⇒ 99.84% |
| $L(e_{i,j})$ = DNS | R | $P(\text{FileSharing} \notin L(e_{i,j}))$: 76.12% ⇒ 99.47% |
| $L(e_{i,j})$ = Web | R | $P(\text{FileSharing} \notin L(e_{i,j}))$: 76.12% ⇒ 94.95% |
| AMONG INTERNAL ENDPOINTS | | |
| $L(e_{i,j})$ = Games | A | $P(\text{FileSharing} \notin L(e_{i,j}))$: 44.43% ⇒ 86.26% |
| $L(e_{i,j})$ = VoIP | R | $P(\text{FileSharing} \notin L(e_{i,j}))$: 44.43% ⇒ 32.06% |

As demonstrated by Table 4, there appear to be mostly strong repulsive effects among external endpoints. The types of repulsive effects illustrated in Rows 1-3 (i.e., Business, Chat, and Mail) are likely due to the fact that external servers typically provide only one particular type of service. For instance, Chat and Multimedia services are likely served by different servers (whether they belong to the same or different content providers). Similarly, the types of repulsive effects illustrated in Rows 4-5 (i.e., DNS and Web) are likely due to the roles of the external endpoints. For example, given an edge labeled as DNS (where the internal endpoints are ISP clients), the external endpoints must be DNS servers. Hence, the chance that an external endpoint exchanges FileSharing traffic with an internal endpoint is extremely small.

By contrast, there appear to be both strong repulsive and attractive effects among internal endpoints. For example, if an internal endpoint generates Games traffic, then the chance that the same endpoint also generates FileSharing traffic increases from 44.43% to 86.26% (indicating a strong attractive effect). On the other hand, if an internal endpoint generates VoIP traffic, the chance that the same endpoint also generates FileSharing traffic drops to 32.06% (indicating a strong repulsive effect).

Guided in part by these characteristics, the TAG edge color inference problem can be formulated mathematically. The problem uses both the spatial disposition of traffic between endpoints and the traffic statistics as follows. Let G=(H, E) be an uncolored TAG as defined above (i.e., where H=IH ∪ OH is the set of the observed internal and external endpoints, and E is the set of edges representing the collection of internal and external endpoint pairs represented in at least one flow record). Furthermore, associated with each edge $e_{i,j} \in E$ is a set of m attributes, denoted as $x_{i,j} = X_{i,j}^{(1)}, X_{i,j}^{(2)}, \ldots, X_{i,j}^{(m)}$. For $1 \leq u \leq m$, $X_{i,j}^{(u)}$ represents one of the flow-level traffic statistics (e.g., the number of packets transmitted) listed in Table 2. (thus, m=11 for the exemplary statistics illustrated in Table 2). Thus, the attribute set associated with each edge characterizes the network traffic between the internal and external endpoint pair $h_i \in IH$ and $h_j \in OH$.

In one embodiment, it is assumed that each edge $e_{i,j} \in E$ belongs to one of K predefined colors (application classes) $C_k$, where $1 \leq k \leq K$ (and where K=12 in this example). However, which class $e_{i,j}$ belongs to is unknown and to be determined. Let L: $E \rightarrow \{C_k, 1 \leq k \leq K\}$ denote the edge color mapping, $L(e_{i,j}) = C_k$ for some k. The TAG edge color inference problem is then defined as the problem of inferring this edge color mapping L, given the uncolored TAG G and the collection of edge attribute sets $\{x_{i,j}: e_{i,j} \in E\}$. To solve this problem, embodiments of the present disclosure assume a supervised machine learning environment in which a training set (i.e., a colored TAG in which each edge color is known) is given. The TAG edge color inference problem then becomes the following learning problem: Can one learn a function f which returns an estimate of the edge color mapping $\tilde{L}(e_{i,j}) = f(y_{i,j})$, ∀ $e_{i,j} \in E$? Here, $y_{i,j}$ denotes the following input vector associated with each edge $e_{i,j}$:

$$y_{i,j} = (x_{i,j}, L(e_i), L(e_j))$$ (EQN. 1)

where $e_i$, $e_j \subset L$ represents the edges incident on the internal endpoint $h_i$ and the edges incident on the external endpoint $h_j$, respectively; and $L(e_i)$ and $L(e_j)$ are the collections of corresponding edge colors. As in any supervised machine learning problem, the "goodness" of the learned function f will be judged based on not only the training dataset, but also on testing datasets.

EQN. 1, above, indicates that the edge color problem depends not only on the traffic statistics on each edge $e_{i,j}$, but also on the collective distribution of all traffic exchanged with the two endpoints $h_i$ and $h_j$, as reflected by the edge colors within a neighborhood of these two endpoints on G. Without knowledge of G, the problem reduces to a classic multi-class classification problem, where one learns f that returns an estimate of the edge label based purely on the traffic statistics attributes (i.e., $\tilde{L}(e_{i,j}) = f(x_{i,j})$). The present disclosure is in part concerned with the question of whether and how the spatial disposition of traffic embodied by the TAG can be exploited in learning and predicting the edge colors (dominant application classes) within traffic between two endpoints. Based on the observations regarding colored TAGS, discussed above, the present disclosure effectively solves the TAG edge color inference problem by utilizing both the local properties of the TAGs and the traffic statistic attributes associated with each edge.

Figure 7:
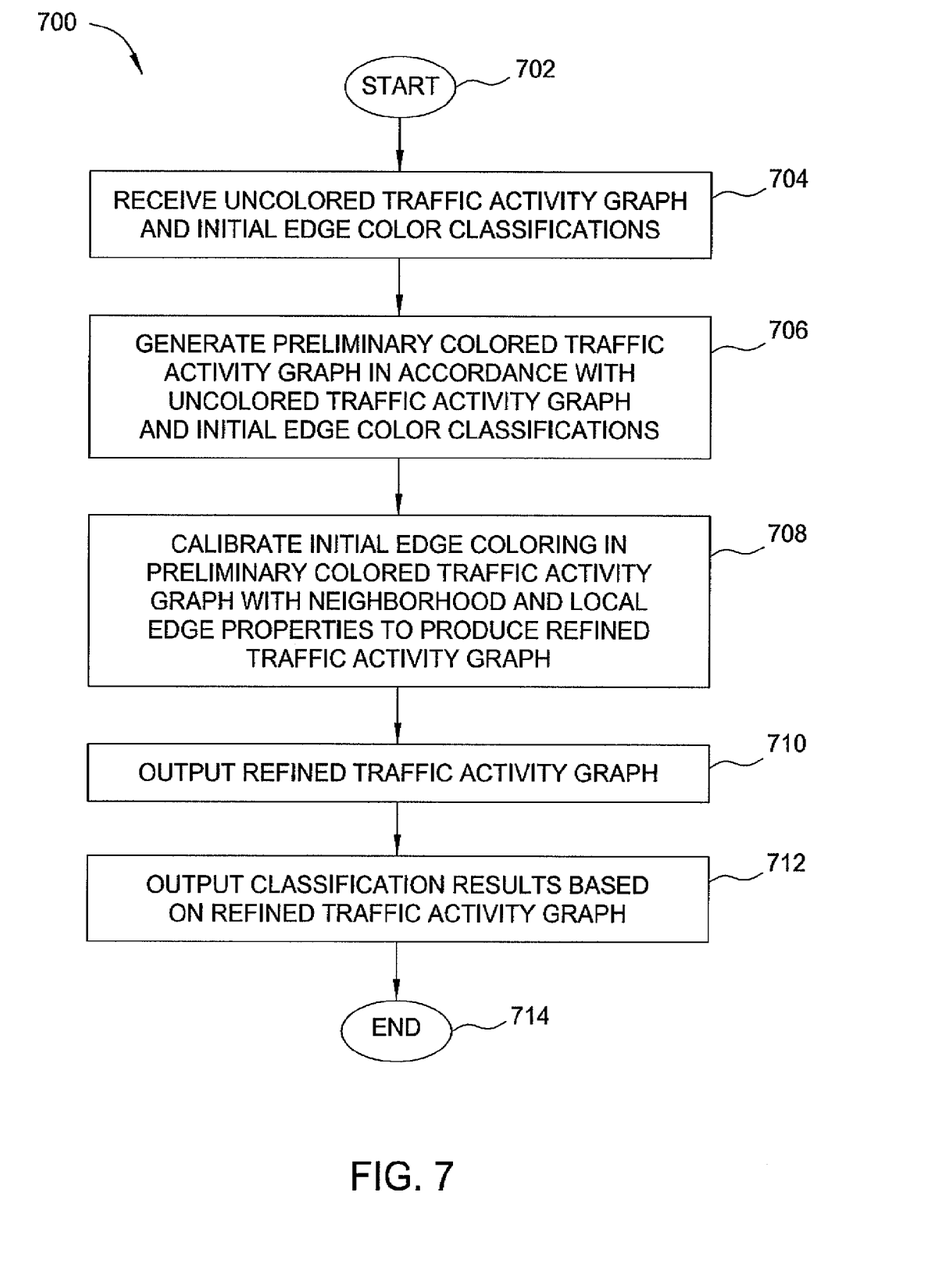
FIG. 7 is a flow diagram illustrating one embodiment of a method for classifying applications associated with network traffic.

FIG. 7 is a flow diagram illustrating one embodiment of a method 700 for classifying applications associated with network traffic (or, alternatively, for classifying the colors of edges in a TAG). The method 700 may be implemented, for example, by the collectors 112 illustrated in FIG. 1. As such, reference is made in the discussion of FIG. 7 to various elements of FIG. 1. It will be appreciated, however, that the method 700 is not limited to implementation with the configuration illustrated in FIG. 1 and may, for example, be implemented in networks having alternate configurations.

The method 700 is initialized in step 702 and proceeds to step 704, where the collector 112 receives an uncolored TAG and a set of initial edge color classifications.

In step 706, the collector 112 generates a preliminary colored TAG in accordance with the uncolored TAG and the initial edge color classifications received in step 704. This step treats the edges of the uncolored TAG as independent and identically distributed random variables and infers edge colors according to only the traffic attributes $x_{i,j}$ associated with each edge (i.e., regardless of any structural properties of the uncolored TAG). This inference of initial edge colors can be expressed mathematically as:

$$\tilde{L}_0(e_{i,j}) = f_0(x_{i,j})$$ (EQN. 2)

The preliminary colored TAG provides initial labels for all edges, though the accuracy of these labels depends on the available traffic information in different application scenarios.

In step 708, the collector 112 calibrates (i.e., re-enforces or re-colors) the initial edge colorings of the preliminary TAG with the inherent neighborhood and local properties of the edges. This produces a refined TAG. For example, given an edge that is initially colored red but resides in a neighborhood of the preliminary TAG where all other edges are initially colored blue, the calibration performed in step 708 may change the red edge to blue in accordance with the edge clustering rule (discussed above). This calibration step may be expressed mathematically as:

$$\tilde{L}(e_{i,j}) = f_1(\tilde{L}_0(e_i), \tilde{L}_0(e_j))$$ (EQN. 3)

Therefore, from EQN. 3, the color mapping is expressed as a combination of steps 706 (also referred to as a "bootstrapping" phase) and 708 (also referred to as a "graph-based calibration" phase). Thus, the inference on the color of a particular edge $e_{i,j}$ is based on the initial (rough) coloring of the neighborhood edges $\tilde{L}_0(e_i)$, $\tilde{L}_0(e_j)$ from step 706. The training of the classification function $f_1$ performed in step 708 depends on this initial coloring, which is provided by the function $f_0$ in step 706.

In step 710, the collector 112 outputs the refined TAG (e.g., to a service provider). In addition, in step 712, the collector 112 outputs traffic classification results, which are based on the refined traffic activity graph. A service provider may use the traffic classification results, for example, to manage a network operated by the service provider. The method 700 then terminates in step 714.

In one embodiment, both the bootstrapping phase and the graph-based calibration phase are treated as classical multi-class classification problems. Hence, the functions $f_0$ and $f_1$ correspond to two multi-class classifiers. In one embodiment, machine learning techniques are applied to learn these classifiers and solve the edge color inference problem.

Given the ground truth of edge colors in the training dataset, the multi-class classifier $f_0$ is first learned. The classifier $f_0$ maps traffic features $x_{i,j}$ corresponding to each edge $e_{i,j}$ to the initial coloring $\tilde{L}_0(e_{i,j})$. Initial coloring is then generated for the entire (uncolored) TAG $\tilde{L}_0(G)$. The classifier $f_1$ is next learned for the graph-based calibration phase, which maps the initial coloring to the true coloring based on the colors of the neighbors of the individual edges.

At runtime (i.e., after the classifiers have been learned), a TAG G is created from the test dataset. $f_0$ is first applied to the TAG G to obtain initial colors for all of the edges in the TAG, namely, $\tilde{L}_0(G)$. The neighborhood information of all of the edges is then encoded into a plurality of histograms, and $f_1$ is applied to generate the final or refined TAG edge coloring $\tilde{L}(G)$.

The two classifiers $f_0$ and $f_1$ differ only in the feature sets. Specifically, $f_0$ uses traffic features associated with individual edges. The available traffic features depend on specific applications. Neighborhood information may be encoded as features for constructing $f_1$ as follows.

Given the fact that an edge may have an unbounded number of neighborhood edges connected to the same endpoints (nodes), the neighborhood information is in one embodiment encoded as histograms. More specifically, for an edge $e_{i,j}$, let $|C_k|$ denote the number of edges connected to endpoint $h_i$ that are labeled as $C_k$=1≤k≤K. K features are then defined corresponding to the neighborhood edges connected to the endpoint $h_i$ as $|C_k|/\Sigma_j|C_j|$, representing the percentage of edges connected to endpoint $h_i$ that are labeled as $C_k$. Similarly, K features are defined to encode the neighborhood edges connected to the endpoint $h_j$. In addition, the degrees of endpoints $h_i$ and $h_j$ are included as features (since, as discussed above, nodes degrees are good features from which to infer node color). In one embodiment, for K=12 (i.e., the number of exemplary application classes defined in Table 1), twenty-six features are created to encode the neighborhood information of individual edges. Encoding objects as histograms in this way enables a fast deployment of machine learning solutions.

The classifiers $f_0$ and $f_1$ may be trained in the same way. One embodiment of a method for training the classifiers is discussed in greater detail below, using the classifier $f_0$ as an example. The method is a decoupled approach that trains K binary classifiers corresponding to K posterior probabilities $P(C_k|x_{i,j})$, where 1≤k≤K. Given this model, the K posterior probabilities are then compared, and the example is assigned to the application class (or color) $f_0(e_{i,j})=\text{argmax}_{C_k} P(C_k|x_{i,j})$. In the ideal case, this assignment exactly corresponds to the Bayes optimum for the multi-class classification problem.

In one embodiment, the K (K=12) binary classifiers are implemented using the AdaBoost machine learning algorithm, which applies a greedy incremental approach that can be restricted to learn a limited number of features (with implicit $L_1$ regularization). The output classifiers are remapped to approximate $P(C_k|x_{i,j})$, using uni-variate logistic regression. To balance accuracy with scalability, one embodiment of the disclosure chooses the decision stump (i.e., a one-level decision tree) as the weak learner. The AdaBoost machine learning algorithm with decision stumps is referred to herein as "BStump."

During the training phase, the number of iterations (or number of weak learners) used by BStump is specified as T. For example, T may equal one hundred. At iteration t, BSTump selects one particular flow feature and the corresponding feature value δ that best partitions the training dataset, weighted based on the classification result in iteration t-1 into positive (target class) and negative (other classes) instances.

BStump creates a decision stump using the selected feature as the weak learner $h_t$. Each weaker learner outputs S_ for a feature value below δ (for a continuous feature) or not equal to δ (for a categorical feature), and outputs $S_+$ otherwise. A total score corresponding to a combination of weak learners is computed, and a threshold is applied to compute a binary outcome. The data weights are adjusted in order to best reproduce the ground truth on all flows. The process is iterated until T weak learners are generated.

At run time, for each flow x, T scores are generated by the weak learners from the binary classifier corresponding to the target class C, and these scores are summed as the prediction $f(C|x)=\Sigma_{t=1}^{T} h_t(x)$. The score $f_c$ is then converted to the posterior probability $P(C|x)$ using logistic regression.

Embodiments of the disclosure have application in many scenarios. For example, the methods discussed above may be advantageously implemented in the areas of network management and security monitoring. Within these areas, the present disclosure can be implemented to classify traffic flows based on only the basic flow features and without, for example, utilizing TCP/UDP port numbers. However, the present disclosure can also be implemented to improve the performance of machine learning-based traffic classification algorithms that have access to all traffic attributes, including port numbers. The present disclosure is not limited to application in these areas and scenarios, however.

Figure 8:
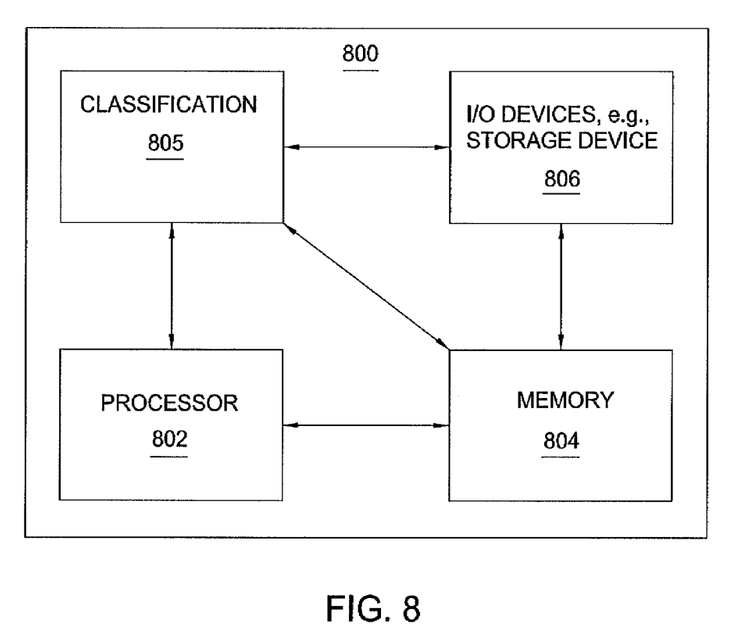
FIG. 8 is a high level block diagram of the network traffic classification method that is implemented using a general purpose computing device.

FIG. 8 is a high level block diagram of the network traffic classification method that is implemented using a general purpose computing device 800. The general purpose computing device 800 may be part of a media gateway, for example. In one embodiment, a general purpose computing device 800 comprises a processor 802, a memory 804, a classification module 805 and various input/output (I/O) devices 806 such as a display, a keyboard, a mouse, a modem, a stylus, a joystick, a keypad, controller, a network interface, and the like. In one embodiment, at least one I/O device is a storage device (e.g., a disk drive, an optical disk drive, a floppy disk drive). It should be understood that the classification module 805 can be implemented as a physical device or subsystem that is coupled to a processor through a communication channel.

Alternatively, the classification module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the classification module 805 for classifying applications using the collective properties of network traffic described herein with reference to the preceding Figures can be stored on a non-transitory computer readable storage medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for producing a final traffic activity graph, the method comprising:
    receiving, by a processor, a traffic activity graph, the traffic activity graph comprising a plurality of nodes interconnected by a plurality of edges, where each of the plurality of nodes represents an endpoint associated with a communication network and each of the plurality of edges represents traffic exchanged between a corresponding pair of the plurality of nodes;
    generating, by the processor, an initial set of inferences as to an application class associated with each of the plurality of edges, based on a measured statistic related to a plurality of traffic flows in the communication network, wherein the initial set of inferences comprises an inference of a first application class associated with a first edge of the plurality of edges and an inference of a second application class associated with a second edge of the plurality of edges, wherein the first application class associated with the first edge and the second application class associated with the second edge are different ones of a plurality of potential application classes, wherein the first edge and the second edge are incident on a same node of the plurality of nodes; and
    refining, by the processor, the initial set of inferences based on a spatial distribution of the plurality of traffic flows, to produce the final traffic activity graph.

2. The method of claim 1, wherein each of the plurality of potential application classes is visually differentiated in the traffic activity graph.

3. The method of claim 2, wherein each of the plurality of potential application classes is identified by a different color, where those of the plurality of edges that are associated with a given application class are colored in the traffic activity graph with a color associated with the given application class.

4. The method of claim 3, wherein each of the plurality of edges is colored in the traffic activity graph with a single color.

5. The method of claim 4, wherein the single color is associated with one of the plurality of potential application classes that is dominantly represented in traffic exchanged between two of the plurality of nodes that are connected by a given edge.

6. The method of claim 1, wherein the measured statistic is derived from a packet header of a traffic flow between a pair of the plurality of nodes.

7. The method of claim 1, wherein the spatial distribution of the plurality of traffic flows is defined by a distribution of a degree value associated with the plurality of nodes.

8. The method of claim 7, wherein one of the plurality of potential application classes is assumed to be associated with those nodes of the plurality of nodes having a high degree relative to other nodes of the plurality of nodes.

9. The method of claim 1, wherein the spatial distribution of the plurality of traffic flows is defined by a clustering effect in which those of the plurality of edges that are associated with a common one of the plurality of potential application classes are incident on a common one of the plurality of nodes.

10. The method of claim 9, wherein it is assumed that, for a given edge in the plurality of edges, the given edge being associated with two of the plurality of nodes, other edges incident on one of the two of the plurality of nodes are associated with a same one of the plurality of potential application classes as the given edge.

11. The method of claim 1, wherein the spatial distribution of the plurality of traffic flows is defined by a repulsive effect and an attractive effect.

12. The method of claim 11, wherein it is assumed that, given the first application class, the second application class, and a given node, a presence of an edge associated with the first application class being incident on the given node reduces a probability that an edge associated with the second application class is also incident on the given node.

13. The method of claim 11, wherein it is assumed that, given the first application class, the second application class, and a given node, a presence of an edge associated with the first application class being incident on the given node increases a probability that an edge associated with the second application class is also incident on the given node.

14. The method of claim 1, wherein the refining results in an inference in the initial set of inferences being changed.

15. The method of claim 14, wherein the inference that is changed predicts an application class with which one of the plurality of edges is associated.

16. The method of claim 1, wherein the initial set of inferences is obtained using machine learning.

17. The method of claim 16, wherein the machine learning comprises:
    learning a first classification function that estimates a first mapping of each of the plurality of edges to respective initial application classes; and
    applying the first classification function to the traffic activity graph to produce the initial set of inferences.

18. The method of claim 17, wherein the machine learning further comprises:
    learning a second classification function that estimates a second mapping of each initial application class to a true application class based on a classification of a neighboring edge; and
    applying the second classification function to produce the final traffic activity graph.

19. A non-transitory computer readable medium storing an executable program for producing a final traffic activity graph which, when executed by a processor, causes the processor to perform operations, the operations comprising:
    receiving a traffic activity graph, the traffic activity graph comprising a plurality of nodes interconnected by a plurality of edges, where each of the plurality of nodes represents an endpoint associated with a communication network and each of the plurality of edges represents traffic exchanged between a corresponding pair of the plurality of nodes;
    generating an initial set of inferences as to an application class associated with each of the plurality of edges, based on a measured statistic related to a plurality of traffic flows in the communication network, wherein the initial set of inferences comprises an inference of a first application class associated with a first edge of the plurality of edges and an inference of a second application class associated with a second edge of the plurality of edges, wherein the first application class associated with the first edge and the second application class associated with the second edge are different ones of a plurality of potential application classes, wherein the first edge and the second edge are incident on a same node of the plurality of nodes; and
    refining the initial set of inferences based on a spatial distribution of the plurality of traffic flows, to produce the final traffic activity graph.

20. A device for producing a final traffic activity graph, the device comprising:
- a processor; and
- a computer-readable medium storing an executable program which, when executed by the processor, causes the processor to perform operations, the operations comprising:
  - receiving a traffic activity graph, the traffic activity graph comprising a plurality of nodes interconnected by a plurality of edges, where each of the plurality of nodes represents an endpoint associated with a communication network and each of the plurality of edges represents traffic exchanged between a corresponding pair of the plurality of nodes;
  - generating an initial set of inferences as to an application class associated with each of the plurality of edges, based on a measured statistic related to a plurality of traffic flows in the communication network, wherein the initial set of inferences comprises an inference of a first application class associated with a first edge of the plurality of edges and an inference of a second application class associated with a second edge of the plurality of edges, wherein the first application class associated with the first edge and the second application class associated with the second edge are different ones of a plurality of potential application classes, wherein the first edge and the second edge are incident on a same node of the plurality of nodes; and
  - refining the initial set of inferences based on a spatial distribution of the plurality of traffic flows, to produce the final traffic activity graph.

* * * * *